(12) United States Patent
Sage (10) Patent No.: US 7,751,718 B2
(45) Date of Patent: Jul. 6, 2010

(54) EFFICIENT TRANSMISSION OF DIGITAL RETURN PATH DATA IN CABLE TELEVISION RETURN PATH

(75) Inventor: Gerald F. Sage, Chico, CA (US)

(73) Assignee: Finisar Corporation, Sunnyvale, CA (US)

( * ) Notice: Subject to any disclaimer, the term of this patent is extended or adjusted under 35 U.S.C. 154(b) by 2402 days.

(21) Appl. No.: 10/102,625

(22) Filed: Mar. 19, 2002

(65) Prior Publication Data

US 2003/0154498 A1  Aug. 14, 2003

Related U.S. Application Data

(60) Provisional application No. 60/356,955, filed on Feb. 12, 2002.

(51) Int. Cl.
*H04B 10/12* (2006.01)
(52) U.S. Cl. .......... 398/141; 398/154; 398/77; 398/78; 398/115
(58) Field of Classification Search .......... 725/131, 725/150, 126, 121, 122; 398/141, 154, 77, 398/78, 115
See application file for complete search history.

(56) References Cited

U.S. PATENT DOCUMENTS

| 4,513,426 A | * | 4/1985 | Jayant | .......... 375/243 |
|---|---|---|---|---|
| 4,809,271 A | | 2/1989 | Kondo et al. | |
| 4,862,392 A | | 8/1989 | Steiner | |
| 4,918,446 A | * | 4/1990 | Yagi | .......... 341/94 |
| 5,014,309 A | | 5/1991 | West, Jr. | |
| 5,036,315 A | | 7/1991 | Gurley | |
| 5,070,402 A | * | 12/1991 | Ishii et al. | .......... 375/240.24 |
| 5,113,189 A | | 5/1992 | Messer et al. | |
| 5,142,690 A | | 8/1992 | McMullan, Jr. et al. | |
| 5,155,590 A | | 10/1992 | Beyers, II et al. | .......... 358/86 |
| 5,208,854 A | | 5/1993 | West, Jr. | |
| 5,225,902 A | | 7/1993 | McMullan, Jr. | .......... 358/86 |

(Continued)

FOREIGN PATENT DOCUMENTS

WO   WO 00/25459   5/2000

(Continued)

OTHER PUBLICATIONS

United States Patent and Trademark Office, U.S. Appl. No. 10/845,006 Final Rejection mailed Dec. 23, 2008.

(Continued)

*Primary Examiner*—Ken N Vanderpuye
*Assistant Examiner*—Hibret A Woldekidan
(74) *Attorney, Agent, or Firm*—Workman Nydegger (57) ABSTRACT

An efficient means for transmitting digitized return path signals over a cable television return path is disclosed. In one embodiment of the invention, the cable television return path includes a node that receives an analog return signal from a subtree of the cable television system and generates a digital transport signal representative of the analog return path signal. The digital transport signal, however, is not a digitized form of the analog return signal. Rather, the digital transport signal is encoded such that fewer bits are used to represent the analog return signal without substantially impacting the accuracy and dynamic range of the signal. At the hub, the digital transport signal is decoded and converted to produce an analog signal that is a close approximation of the analog return signal.

13 Claims, 6 Drawing Sheets

U.S. PATENT DOCUMENTS

| | | | |
|---|---|---|---|
| 5,235,619 A | 8/1993 | Beyers, II et al. | |
| 5,243,651 A | 9/1993 | Parikh et al. | |
| 5,245,420 A | 9/1993 | Harney et al. | |
| 5,247,364 A | 9/1993 | Banker et al. | 358/191.1 |
| 5,251,324 A | 10/1993 | McMullan, Jr. | |
| 5,255,086 A | 10/1993 | McMullan, Jr. et al. | |
| 5,301,028 A | 4/1994 | Banker et al. | 348/570 |
| 5,303,295 A | 4/1994 | West et al. | |
| 5,313,467 A | 5/1994 | Varghese et al. | |
| 5,317,391 A | 5/1994 | Banker et al. | 348/6 |
| 5,319,454 A | 6/1994 | Schutte | |
| 5,323,462 A | 6/1994 | Farmer | |
| 5,357,276 A | 10/1994 | Banker et al. | 348/7 |
| 5,430,568 A | 7/1995 | Little et al. | 359/124 |
| 5,442,472 A | 8/1995 | Skrobko | 359/110 |
| 5,481,542 A | 1/1996 | Logston et al. | |
| 5,497,187 A | 3/1996 | Banker et al. | 348/6 |
| 5,499,241 A | 3/1996 | Thompson et al. | 370/73 |
| 5,505,901 A | 4/1996 | Harney et al. | |
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,677,980 A * | 10/1997 | Naoe | 386/109 |
| 5,680,394 A | 10/1997 | Bingham et al. | |
| 5,684,799 A | 11/1997 | Bigham et al. | |
| 5,719,867 A | 2/1998 | Borazjani | 370/436 |
| 5,719,872 A | 2/1998 | Dubberly et al. | 370/487 |
| 5,794,117 A | 8/1998 | Benard | |
| 5,826,167 A | 10/1998 | Jelinek et al. | 455/5.1 |
| 5,844,706 A | 12/1998 | Kohn et al. | |
| 5,854,703 A | 12/1998 | West, Jr. | 359/167 |
| 5,854,830 A | 12/1998 | Kenmochi | |
| 5,864,560 A | 1/1999 | Li et al. | |
| 5,907,363 A * | 5/1999 | Botsford et al. | 375/240.05 |
| 5,926,478 A | 7/1999 | Ghaibeh et al. | |
| 5,930,231 A | 7/1999 | Miller et al. | 370/210 |
| 5,963,352 A | 10/1999 | Atlas et al. | 359/161 |
| 6,041,056 A | 3/2000 | Bingham et al. | |
| 6,041,066 A | 3/2000 | Meki et al. | |
| 6,161,011 A | 12/2000 | Loveless | 455/426 |
| 6,175,861 B1 | 1/2001 | Williams, Jr. et al. | |
| 6,178,446 B1 | 1/2001 | Gerszberg et al. | |
| 6,272,150 B1 | 8/2001 | Hrastar et al. | 370/486 |
| 6,356,369 B1 | 3/2002 | Farhan | 359/125 |
| 6,356,374 B1 | 3/2002 | Farhan | 359/180 |
| 6,373,611 B1 | 4/2002 | Farhan et al. | 359/180 |
| 6,389,075 B2 * | 5/2002 | Wang et al. | 375/240.16 |
| 6,417,949 B1 * | 7/2002 | Farhan et al. | 398/141 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 * | 10/2002 | West, Jr. | 398/141 |
| 6,493,005 B1 | 12/2002 | Wu | |
| 6,505,271 B1 * | 1/2003 | Lien et al. | 711/108 |
| 6,519,067 B2 | 2/2003 | Farhan et al. | 359/180 |
| 6,523,177 B1 | 2/2003 | Brown | 725/121 |
| 6,535,715 B2 | 3/2003 | Dapper et al. | |
| 6,622,281 B1 | 9/2003 | Yun et al. | |
| 6,625,166 B2 | 9/2003 | Tsukamoto et al. | |
| 6,715,124 B1 * | 3/2004 | Betts | 714/792 |
| 6,751,269 B1 | 6/2004 | Shalvi et al. | |
| 6,754,221 B1 | 6/2004 | Whitcher et al. | |
| 6,798,790 B1 | 9/2004 | Enssle et al. | |
| 6,831,901 B2 | 12/2004 | Millar | |
| 7,000,018 B1 | 2/2006 | Begis | |
| 7,131,024 B1 | 10/2006 | Venkata et al. | |
| 7,222,358 B2 | 5/2007 | Levinson | |
| 7,257,328 B2 * | 8/2007 | Levinson et al. | 398/182 |
| 7,519,078 B2 * | 4/2009 | Oyadomari et al. | 370/465 |
| 2002/0073434 A1 | 6/2002 | Pience | |
| 2002/0085589 A1 | 7/2002 | Dravida et al. | |
| 2002/0129379 A1 | 9/2002 | Levinson et al. | |
| 2002/0131426 A1 | 9/2002 | Amit et al. | |
| 2002/0171899 A1 * | 11/2002 | Gurusami et al. | 359/173 |
| 2003/0035445 A1 | 2/2003 | Choi | |
| 2005/0039103 A1 | 2/2005 | Azenko et al. | |
| 2006/0013194 A1 | 1/2006 | Baumann et al. | |

FOREIGN PATENT DOCUMENTS

| | | |
|---|---|---|
| WO | WO 0143441 | 6/2001 |
| WO | WO 01/52455 | 7/2001 |

OTHER PUBLICATIONS

United States Patent and Trademark Office, U.S. Appl. No. 10/845,006, Non-Final Rejection mailed Aug. 7, 2009.

United States Patent and Trademark Office, U.S. Appl. No. 10/845,202, Notice of Allowance mailed Dec. 5, 2008.

United States Patent and Trademark Office, U.S. Appl. No. 10/291,208, Non-Final Rejection mailed Jul. 22, 2008.

United States Patent and Trademark Office, U.S. Appl. No. 10/291,208, Non-Final Rejection mailed May 27, 2009.

United States Patent and Trademark Office, U.S. Appl. No. 10/102,619, Final Rejection mailed Dec. 8, 2008.

United States Patent and Trademark Office, U.S. Appl. No. 10/102,619, Non-Final Rejection mailed Jul. 24, 2009.

U.S. Appl. No. 10/845,202, mailed Apr. 4, 2008, Non-Final Rejection.

U.S. Appl. No. 10/845,006, mailed Jun. 24, 2008, Non-Final Rejection.

U.S. Appl. No. 09/735,710, mailed Dec. 28, 2005, Non-Final Rejection.

U.S. Appl. No. 09/735,710, mailed Jun. 2, 2006, Non-Final Rejection.

U.S. Appl. No. 09/735,710, mailed Oct. 30, 2006, Final Rejection.

U.S. Appl. No. 09/735,710, mailed Apr. 9, 2007, Notice of Allowance.

U.S. Appl. No. 10/285,205, mailed Jan. 6, 2006, Non-Final Rejection.

U.S. Appl. No. 10/285,205, mailed Jul. 25, 2006, Final Rejection.

U.S. Appl. No. 10/285,205, mailed Jan. 22, 2007, Notice of Allowance.

U.S. Appl. No. 10/102,619, mailed Apr. 29, 2008, Non-Final Rejection.

* cited by examiner

EFFICIENT TRANSMISSION OF DIGITAL RETURN PATH DATA IN CABLE TELEVISION RETURN PATH

The present application claims priority to, under 35 U.S.C. 119(e), U.S. Provisional Patent Application bearing 60/356,955, filed Feb. 12, 2002, which is incorporated herein by reference.

BRIEF DESCRIPTION OF THE INVENTION

The present invention is related generally to upstream data communications over networks primarily designed for downstream transmission of television and data signals. More specifically, the present invention pertains to a device and method for improving performance of digital return path links for a cable television (CATV) hybrid fiber co-axial cable (coax) system.

BACKGROUND OF THE INVENTION

Cable television systems (CATV) were initially deployed so that remotely located communities were allowed to place a receiver on a hilltop and then use coaxial cable and amplifiers to distribute received signals down to the town which otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path." A good review of much of today's existing return path technology is contained in the book entitled *Return Systems for Hybrid Fiber Coax Cable TV Networks* by Donald Raskin and Dean Stoneback, hereby incorporated by reference as background information.

One innovation, which has become pervasive throughout the CATV industry over the past decade, is the introduction of fiber optics technology. Optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to connect the neighborhood nodes to homes, businesses and the like in a small geographical area.

Figure 1:
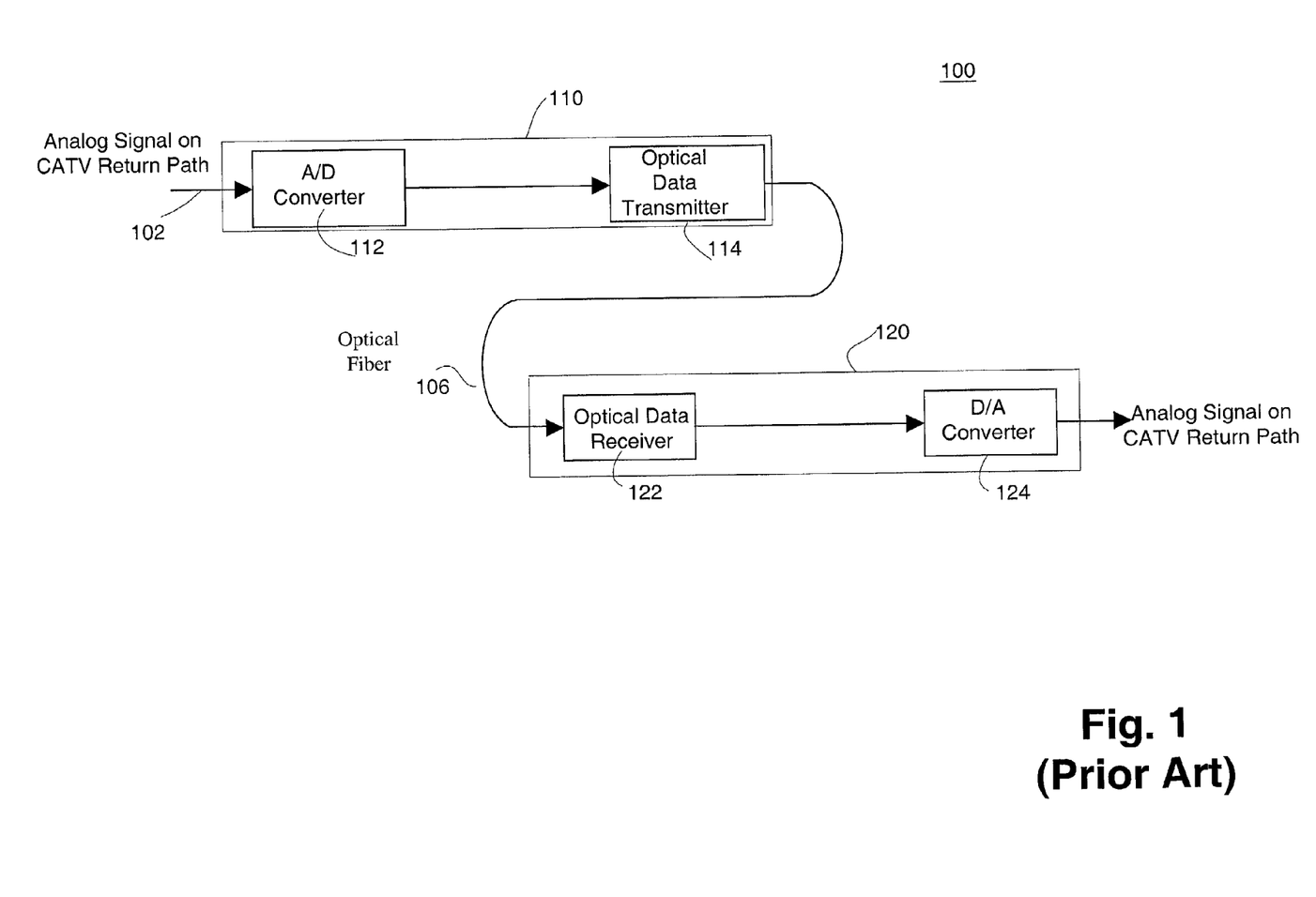
FIG. 1 is a block diagram depicting a cable television (CATV) digital return path of the prior art.

FIG. 1 is a block diagram of a digital return path 100 of a prior art cable television system that uses conventional analog return path optical fiber links. As shown, analog return signals, which include signals generated by cable modems and set top boxes, are present on the coaxial cable 102 returning from the customer. The coaxial cable 102 is terminated at a node 110 where the analog return signals are converted to a digital representation by an A/D converter 112. The digital signal is used to modulate an optical data transmitter 114 and the resulting optical signal is sent over an optical fiber 106 to a hub 120. At the hub 120, the optical signal is detected by an optical receiver 122, and the detected digital signal is used to drive a D/A converter 124 whose output is the recovered analog return signals.

The analog return signals present on the coaxial cable 102 are typically a collection of independent signals. Some of these independent signals may have high peak values and some of the signals may be low level signals. To detect the low level analog return signals and to accommodate the high level analog return signals at the same time, an A/D converter with a large number of bits (e.g., a 10-bit A/D converter) is typically used in the node 110. In the United States, because the analog return signals are in the frequency range of 5 to 42 MHz, the sampling rate of the A/D converter is typically about 100 MHz. A 10-bit A/D converter operating at a sample rate of 100 MHz will output data at a rate of 1 Gbps. Therefore, optical transmitters and the optical receivers in an CATV optical link must be capable of transmitting and receiving optical signals at 1 Gbps or at a higher rate. Naturally, the costs of such high-speed optical equipment are high. Limits on the bandwidth of the optical equipment also restrict the number of analog return signals that can be bundled together for transmission on the same optical fiber.

Accordingly, there exists a need for a system and method for transmitting digital data on the CATV return path at a rate that is lower than a full rate without significant loss of performance.

SUMMARY OF THE INVENTION

An embodiment of the present invention is a cable television return path at which analog return signals are converted to digital format and encoded, and then transmitted across an optical link to a hub. At the hub, the encoded digital signal is decoded and converted to produce an analog signal that is a close approximation of the analog return signal. The encoding scheme of the present embodiment is efficient in reducing the number of bits that are transported across the optical link. Yet, the accuracy of the analog return signal is not substantially compromised. Furthermore, the encoding scheme of the present embodiment is simple, suitable for high-speed operations and cost-effective.

In one embodiment, the cable television return path includes a node that receives an analog return signal from a subtree of the cable television system and generates a digital transport signal representative of the analog return path signal. The digital transport signal, however, is not a digitized form of the analog return signal. Rather, the digital transport signal is encoded such that fewer bits are used to represent the analog return signal without substantially impacting the accuracy and dynamic range of the signal. At the hub, the digital transport signal is decoded and converted to produce an analog signal that is a close approximation of the analog return signal. Because the digital transport signal has fewer bits per sample, a reduced number of bits will be transmitted across the optical link, thus allowing the optical link to operate at a lower transmission rate. At the same transmission rate, a larger number of return signals can be communicated across the optical link. This means that a larger number of analog return links can be bundled together and transported across the optical link.

In one particular embodiment, the node of the cable television return path includes an N-bit A/D converter, an optical transmitter, and an encoder coupled between the A/D converter and the optical transmitter. The encoder is configured to receive N-bit digital samples from the A/D converter and to generate digital samples with fewer than N bits per sample.

Each sample includes a sign bit. In this embodiment, the encoder examines the amplitude of each of the N-bit digital samples. If the amplitude is larger than a predetermined threshold, the encoder generates a selection bit indicating that the sample is a "large" sample, and outputs a transport sample that includes the most significant bits of the N-bit digital sample (including the sign bit) concatenated with the selection bit. If the amplitude is smaller than the threshold, the encoder generates a selection bit indicating that the sample is a "small" sample, and outputs a transport sample that includes the least significant bits of the N-bit digital sample concatenated with the selection bit and the sign bit of the sample. The output of the encoder is then passed to the optical transmitter to be converted to an optical signal for transmission to the hub.

In this embodiment, the hub of the cable television return path includes an optical receiver, a D/A converter, and a decoder coupled between the optical receiver and the D/A converter. At the hub, transport samples are recovered from the optical signals and provided to the decoder, which examines the selection bits of each transport sample and determines whether each sample is a "large" sample or a "small" sample. If the transport sample is "small," then the sign bit of the transport sample is extended to generate an N-bit sample. If the transport sample is "large," then padding bits are added to the transport sample to generate an N-bit sample. The N-bit sample output from the decoder is then provided to the D/A converter to be converted into an analog signal.

BRIEF DESCRIPTION OF THE DRAWINGS

Aspects of the present invention will be more readily apparent from the following description and appended claims when taken in conjunction with the accompanying drawings, in which:

DESCRIPTION OF THE PREFERRED EMBODIMENTS

Figure 2:
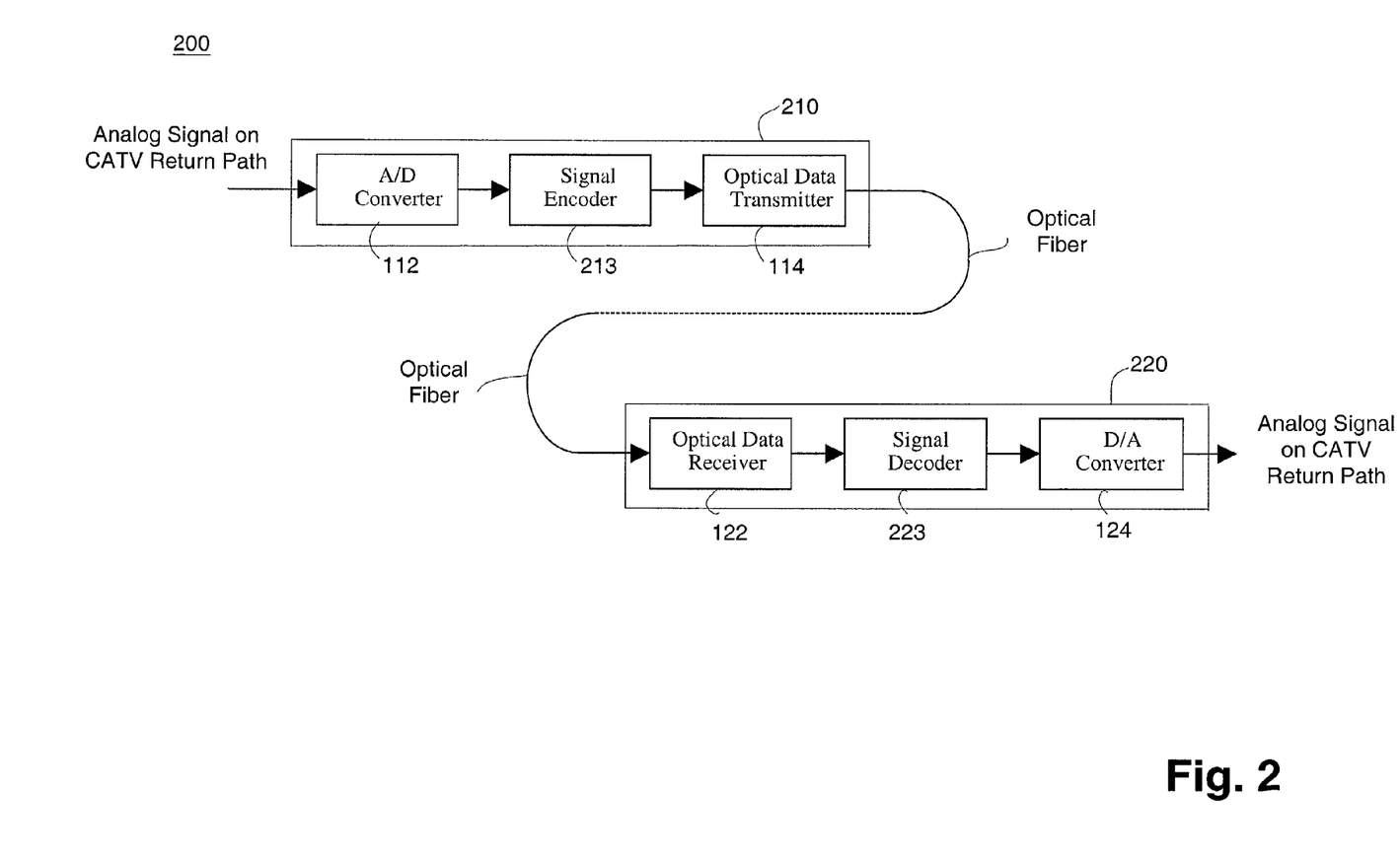
FIG. 2 is a block diagram depicting a CATV return path according to one embodiment of the present invention.

FIG. 2 is a block diagram depicting a CATV return path 200 according to one embodiment of the present invention. At the CATV return path transmitter 210, a signal encoder 213 is coupled to receive and encode the data signal output of the A/D converter 112. The encoded data signal (output by the encoder 213) is provided to the optical transmitter 114 for transmission to a hub 220. At the hub 220, the signal receiver 122 recovers and generates a local replica of the encoded data signal, and a signal decoder 223 is coupled to receive and decode the encoded data signal. The output of the decoder 223, which is a decoded data signal, is provided to a D/A converter 124 for conversion into analog signals. In this embodiment, the signal encoder 213 and signal decoder 223 allow digital data to be transmitted across the optical link at a lower rate than N*F bits per second (where N is the number of bits and F is the sampling frequency of the A/D converter 112) without significant loss of performance.

Figure 3:
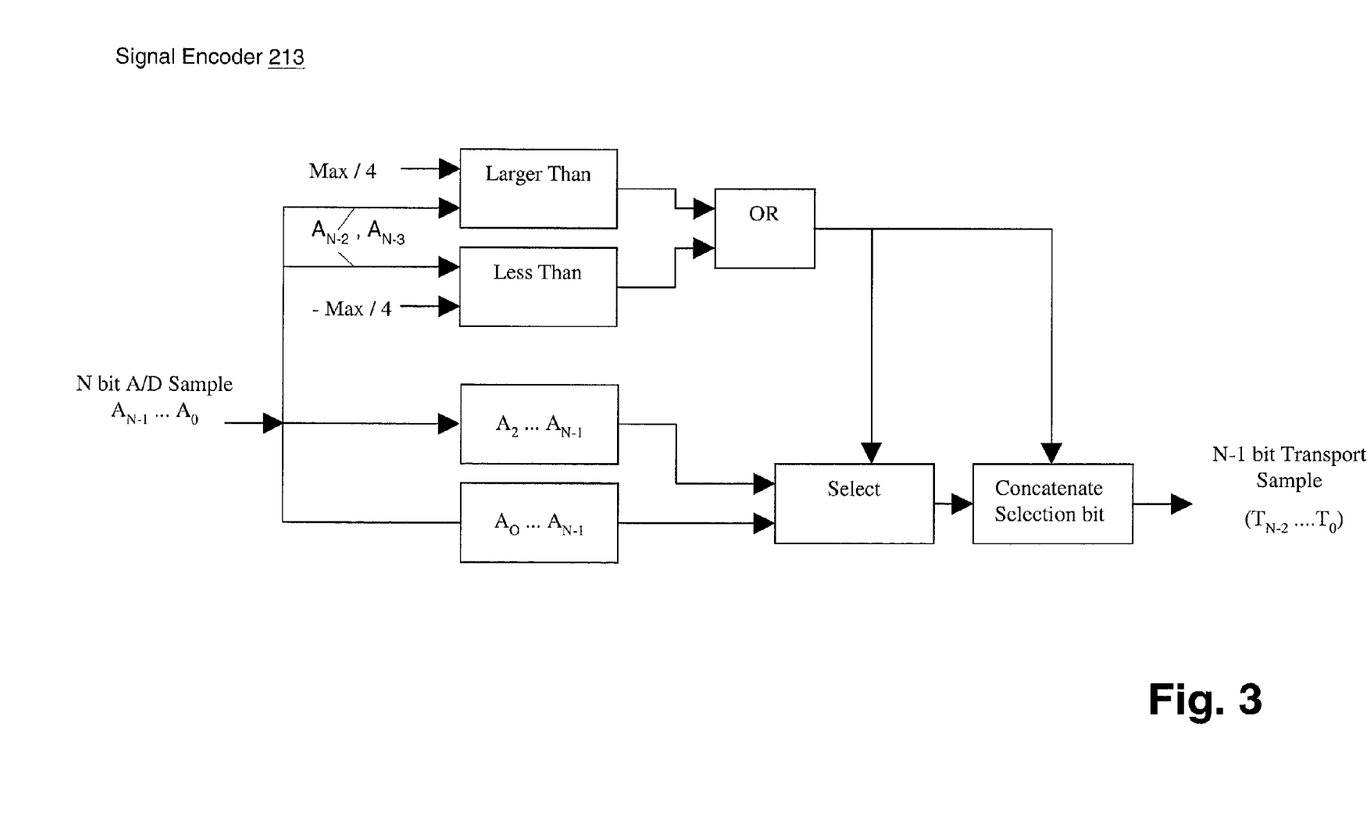
FIG. 3 is a block diagram depicting an encoder that can be used in the CATV return path of FIG. 2.

One implementation of the signal encoder 213 is shown in FIG. 3. In the present example, the input signal from the A/D converter are N-bit samples Ax with bit $A_{N-1}$ being the most significant and bit $A_0$ the least significant. With 2's complement representation of the value, bit $A_{N-1}$ is a sign bit and bits $A_{N-2}$ to $A_0$ are the amplitude with extended sign. The output of the encoder 213 is N−1 bit samples to be transported. These N−1 bit samples are referred to herein as transport samples.

With reference still to FIG. 3, bits $A_{N-2}$ and $A_{N-3}$ are examined to determine if the amplitude of the N-bit sample is larger than the maximum value of the A/D converter divided by four. If the amplitude is larger than the maximum value of the A/D converter divided by four, the selection bit output of the signal encoder 213 is set to a '1'. If the amplitude is equal to or less than the maximum value of the A/D converter divided by four, then the selection bit is set to a '0'. If the N-bit sample is a positive number and either $A_{N-2}$ or $A_{N-3}$ is equal to '1', the selection bit is set to '1'. If the N-bit sample is a positive number and both $A_{N-2}$ and $A_{N-3}$ are equal to '0', the selection bit is set to '0'. If the N-bit sample is a negative number and either $A_{N-2}$ or $A_{N-3}$ is equal to '0', the selection bit is set to '1'. If the N-bit sample is a negative number and both $A_{N-2}$ and $A_{N-3}$ are equal to '1', the selection bit is set to '0'.

Figure 4A:
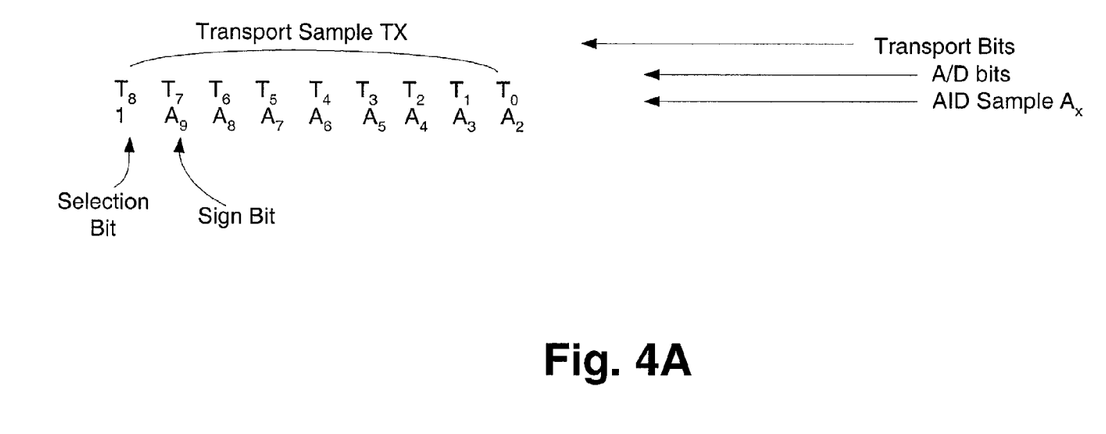
FIG. 4A depicts a relationship between the A/D bits, Ax, of a large sample to the transport bits, Tx, generated by the encoder of FIG. 3.

If the selection bit is '1', a "large" sample is present and the most significant N−2 bits (i.e., $A_{N-1}$ to $A_2$) are transmitted with the selection bit concatenated for a total of N−1 bits. As an example, consider a "large" 10-bit A/D sample, Ax, and a corresponding 9-bit transport sample, Tx, shown in FIG. 4A. This "large" 10-bit A/D sample has an amplitude larger than the maximum value of the A/D converter divided by four. As shown, the selection bit '1' and the most significant N−2 bits (bit $A_9$ to $A_2$) of Ax are mapped to bits $T_8$ to $T_0$ of Tx.

Figure 4B:
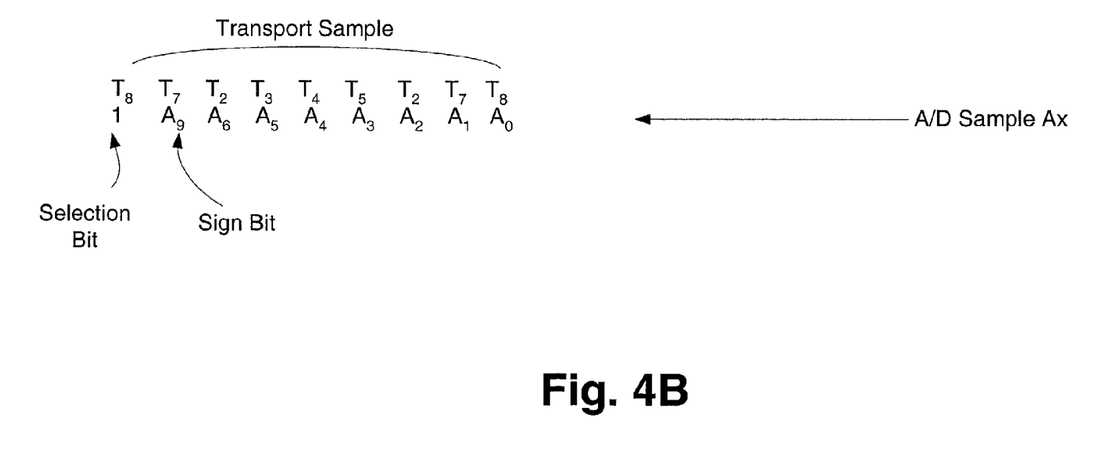
FIG. 4B depicts a relationship between the A/D bits of a small sample to the transport bits generated by the encoder of FIG. 3.

FIG. 4B illustrates a relationship between a "small" 10-bit A/D sample, Ax, and a corresponding transport sample, Tx. As shown, the least significant N−3 bits (e.g., $A_0$ to $A_{N-4}$), together with the sign bit and the selection bit '0', are mapped to bits $T_0$ to $T_8$ of Tx. That is, for a "small" sample whose amplitude is smaller than the maximum value of the A/D converter divided by four, the transmitted bits are: $A_0$ to $A_{N-4}$, $A_{N-1}$ and the selection bit '0' for a total of N−1 bits.

Figure 5:
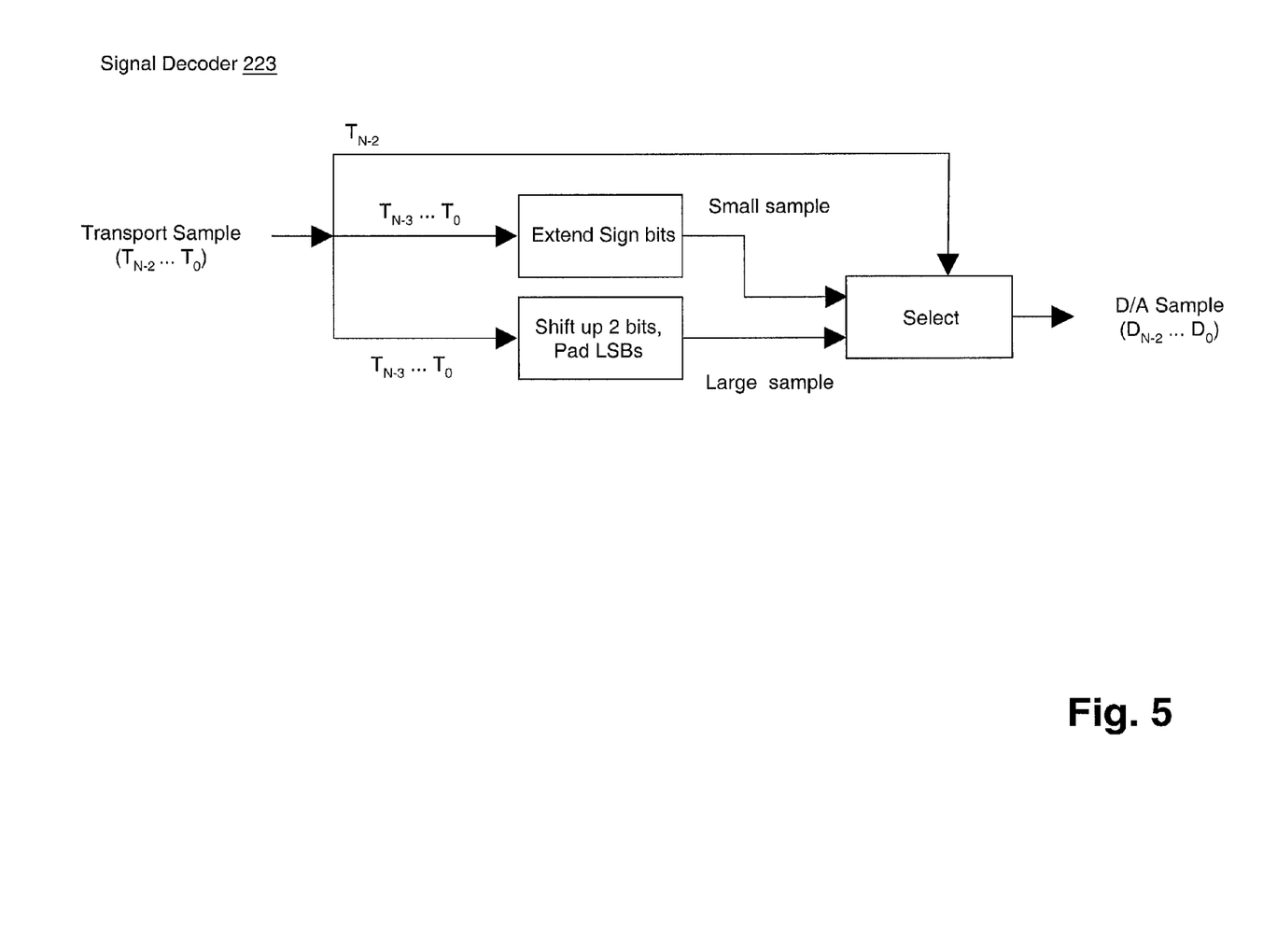
FIG. 5 is a block diagram depicting a decoder that can be used in the CATV return path of FIG. 2.

FIG. 5 is a block diagram depicting the signal decoder 223 according to one embodiment of the present invention. The input signal is the transport sample, Tx, with N−1 bits. The input signal, Tx, is a local replica of the encoded signal. The output is an N bit sample, Dx, for conversion into analog signals by the D/A converter 124.

Figure 6A:
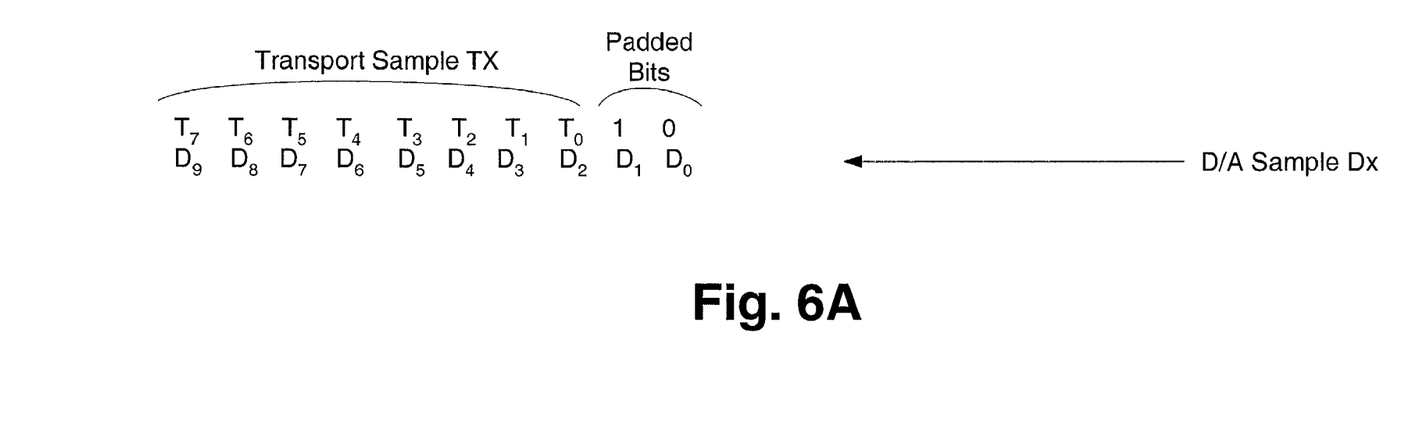
FIG. 6A depicts a relationship between the transport bits, Tx, and the D/A bits, Dx, of a large sample generated by the decoder of FIG. 5.

In operation, the signal decoder 223 examines the transport sample, Tx. If the selection bit is a '1', a "large" sample has been received. The signal decoder 213 then removes the selection bit $T_8$. The D/A sample, Dx, is constructed by mapping the bits $T_0$ through $T_{N-3}$ to the most significant bits of Dx and padding the least two significant bits of Dx with '1' and '0'. As an example, a "large" D/A sample, Dx, constructed from a transport sample Tx is shown in FIG. 6A. In some other embodiments the "large" D/A sample is padded with bits other than '10'.

Figure 6B:
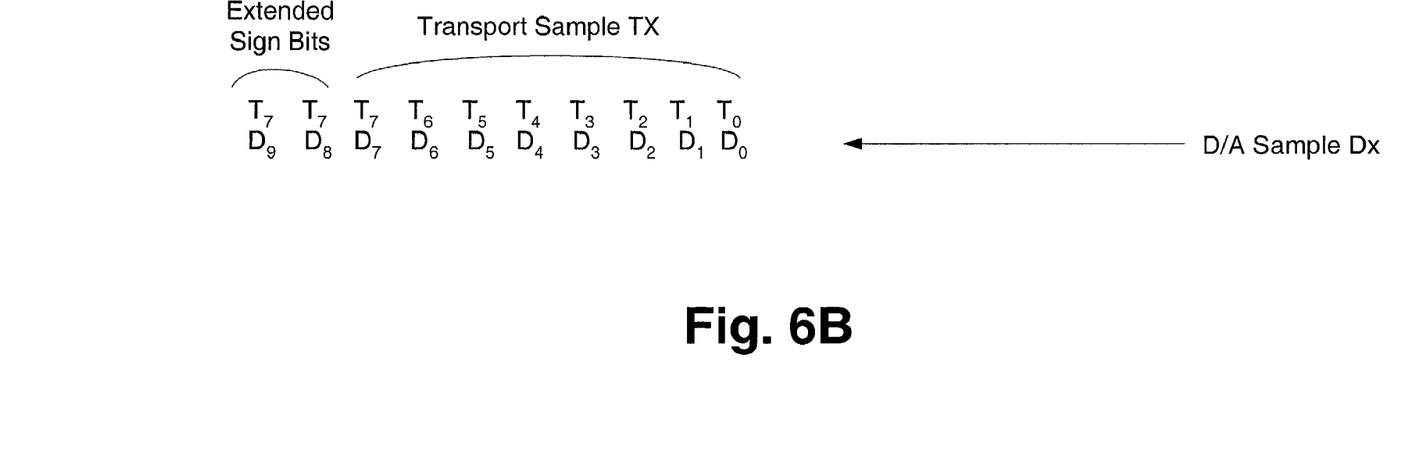
FIG. 6B depicts a relationship between the transport bits, Tx, and the D/A bits, Dx, of a small sample generated by the decoder of FIG. 5.

If the selection bit is a "0", a small sample has been received. The signal decoder 223 removes the selection bit $T_{N-2}$ ($T_{N-2}$ is $T_8$ in our example using 10-bit samples). The D/A sample Dx is constructed by mapping the bits $T_0$ through $T_{N-3}$ to the least significant $D_0$ through $D_{N-3}$ bits and extending the sign bit $T_{N-3}$ ($T_7$ in our example) to fill the $D_{N-1}$ through $D_{N-2}$ bits of the sample Dx. A small D/A sample, Dx, constructed from a transport sample Tx is shown in FIG. 6B.

A preferred embodiment of the present invention, a CATV return path 200 that transports 10-bit A/D samples of a CATV return path signal in 9-bit transport samples, has been described above. In another embodiment, the CATV return path transports return path signals using A/D samples and transport samples that have a different member of bits.

Furthermore, in an embodiment described above, the selection bit gives an offset of two bits between the large and small samples. In other embodiments of the invention, the selection bit may provide an offset of any number of bits between a large and a small sample. For instance, in one embodiment, a selection bit of '1' indicates that N–k most significant bits of the A/D samples are transported, and a selection bit of '0' indicates that the N–(k+1) least significant bits of the A/D samples and their sign bits are mapped to the transport samples. In that embodiment, each transport sample will include N–k+1 bits, for a saving of k–1 bits per sample.

In yet another embodiment, multiple selection bits are used, and each combination of selection bits are used to select different offsets. For instance, in one embodiment, selection bits of '11' indicate that the N–3 most significant bits (e.g., $A_9 \ldots A_3$, when N=10) of the A/D samples are transported in the transport samples, selection bits of '10' indicate that the N–3 most significant bits other than the MSB (e.g., $A_8$, $A_7 \ldots A_2$) are transported in the transport samples, and so on.

In yet another embodiment of the invention, a block of samples (e.g., three consecutive samples) are encoded by the same set of selection bits. The offset for the largest sample in the block is determined first. All samples in the block are then encoded using one set of selection bits. For instance, consider the example where a block consists of three consecutive 10-bit samples and where a 2-bit offset between "large" samples and "small" samples" is used. In this example, $A_{N-2}$ and $A_{N-3}$ of the largest sample in the block are examined to determine whether the amplitude of the largest sample in the block is larger than the maximum value of the A/D converter divided by four. If so, the N–3 most significant bits of all three samples, including each sample's sign bit, and one selection bit are mapped to the transport bits of the transport samples. If not, the N–3 least significant bits of all three samples, including each sample's sign bit, In this way, even fewer bits are required to be transported across the optical link, and the optical receivers/transmitters can operate at a lower clock rate.

While the present invention has been described with reference to a few specific embodiments, the description is illustrative of the invention and is not to be construed as limiting the invention. Various modifications may occur to those skilled in the art without departing from the true spirit and scope of the invention. For instance, embodiments of the present invention described above were implemented by hardware logic (e.g., Field Programmable Gate Array(s)). However, a person of ordinary skill in the art would realize that portions of the present invention can be implemented as a program executable by a digital signal processor.

What is claimed is:

1. A signal encoder for use in a cable television return path, comprising:
   an input configured to receive an N-bit digital input sample from an analog-to-digital converter, the N-bit digital input sample having N bits;
   logic configured to determine whether the N-bit digital input sample has an amplitude that is larger than a predefined threshold, the logic further configured to generate at least one selection output bit indicative of whether the amplitude is larger than the predefined threshold; and
   logic configured to produce a digital output sample representative of the N-bit digital input sample in response to the at least one selection output bit, the digital output sample having the at least one selection output bit but having fewer bits than N; and
   an output, coupled to the logic, configured to provide the digital output sample to an optical transmitter.

2. The signal encoder of claim 1 wherein the predefined threshold equals to a maximum value of the analog-to-digital converter divided by four.

3. The signal encoder of claim 2, wherein the first subset includes N–2 most significant bits of the N-bit digital input sample and wherein the second subset includes N–3 least significant bits of the N-bit digital input sample.

4. The signal encoder of claim 1 wherein the first subset includes at least one bit not included in the second subset and the second subset includes at least one bit not included in the first subset.

5. The signal encoder of claim 1, wherein the digital output sample includes one of a first subset and a second subset of the N bits in the N-bit digital input sample.

6. A signal decoder for use in a cable television return path, comprising:
   an input configured to receive an M-bit digital sample from an optical transmitter by way of an optical receiver, and associated optical fiber, the M-bit digital sample having M bits that includes at least one selection bit and non-selection bits;
   logic configured to insert a plurality of padding bits with the non-selection bits and to remove the selection bit to produce a digital output sample representative of the M-bit digital sample, the digital output sample having more bits than the M-bit digital sample; and
   a digital-to-analog converter coupled to the logic, the digital-to-analog converter configured to provide an analog signal corresponding to the digital output sample, wherein the logic is configured to insert the padding bits as the least significant bits of the digital output sample when the at least one selection bit indicates that the M-bit digital sample is a large sample.

7. A signal decoder for use in a cable television return path, comprising:
   an input configured to receive an M-bit digital sample from an optical transmitter by way of an optical receiver, and associated optical fiber, the M-bit digital sample having M bits that includes at least one selection bit and non-selection bits;
   logic configured to insert a plurality of padding bits with the non-selection bits and to remove the selection bit to produce a digital output sample representative of the M-bit digital sample, the digital output sample having more bits than the M-bit digital sample; and
   a digital-to-analog converter coupled to the logic, the digital-to-analog converter configured to provide an analog signal corresponding to the digital output sample, wherein the logic is configured to extend a sign bit of the non-selection bits to produce the digital output sample when the at least one selection bit indicates that the M-bit digital sample is a small sample.

8. A cable television return path of a cable television system, comprising: an analog-to-digital converter configured to receive an analog return signal from a subtree of the cable television system and configured to generate a first digital signal representative of the analog return signal, the first digital signal having a stream of first digital samples each having N bits;

an encoder configured to receive the first digital signal and to generate a second digital signal that includes a stream of second digital samples each having a fewer number of bits than N, each of the second digital samples including one of a first subset of most significant bits and a second subset of least significant bits of a corresponding one of the first digital samples, wherein the encoder comprises:

logic configured to determine whether the digital sample has an amplitude that is larger than a predefined threshold, the logic further configured to generate at least one selection output bit indicative of whether the digital sample is larger than the predefined threshold; and     logic configured to produce a digital output sample representative of the N-bit digital input sample in response to the at least one selection output bit, the digital output sample having one of a first subset and a second subset of the N bits, the digital output sample having the at least one selection output bit but having fewer bits than N;

an optical transmitter configured to convert the second digital signal into an optical signal;

an optical receiver configured to receive the optical signal and to convert the optical signal into a replica of the second digital signal;

a decoder configured to recover a third digital signal from the replica of the second digital signal, the third digital signal including a stream of third digital samples, wherein each of the third digital samples includes N bits; and     a digital-to-analog converter configured to convert the third digital signal to an analog signal that is substantially equivalent to the analog return signal.

9. The cable television return path of claim 8, wherein the predefined threshold equals to a maximum value of the analog-to-digital converter divided by four.

10. The cable television return path of claim 9, wherein the first subset includes N−2 most significant bits of the N-bit digital input sample and wherein the second subset includes N−3 least significant bits of the N-bit digital input sample.

11. The cable television return path of claim 8, wherein the decoder comprises:

an input configured to receive a digital sample from an optical receiver, the digital sample having fewer bits than N but includes non-selection bits and at least one selection bit; and     logic configured to insert a plurality of padding bits with the non-selection bits to produce a digital output sample representative of the M-bit digital sample, the digital output sample having N bits.

12. The cable television return path of claim 11 wherein the decoder is configured to insert the padding bits as the least significant bits of the digital output sample when the at least one selection bit indicates that the digital sample is a large sample.

13. The cable television return path of claim 11 wherein the decoder is configured to extend a sign bit of the non-selection bits to produce the digital output sample when the at least one selection bit indicates that the digital sample is a small sample.

* * * * *